May 20, 1969  J. A. ACCIARRI  3,445,494
PREPARATION OF ALUMINUM ALKYLS
Filed June 26, 1968  Sheet 3 of 3

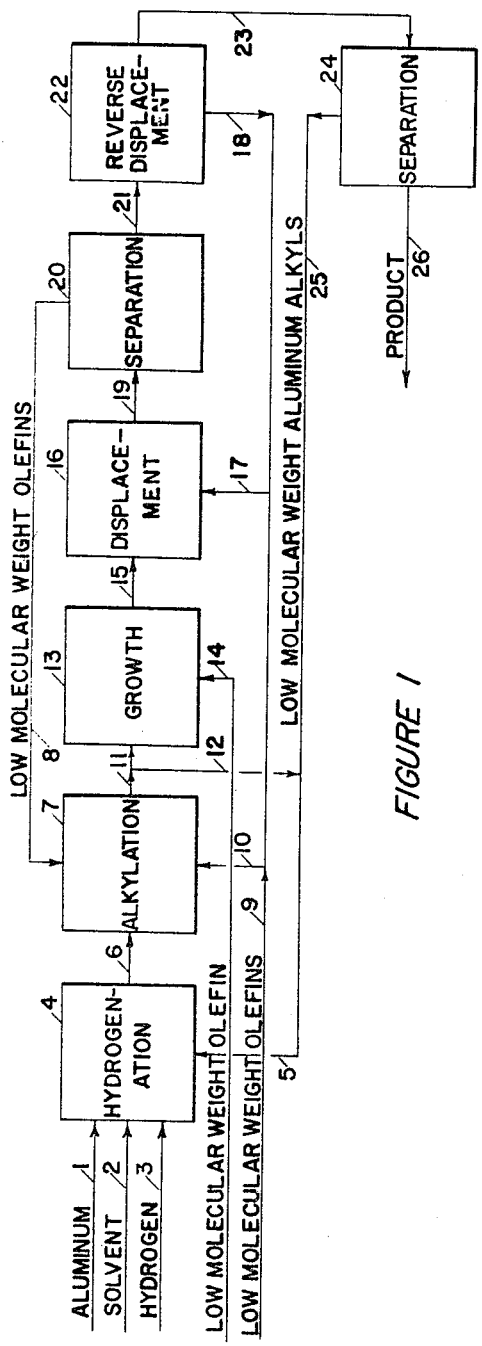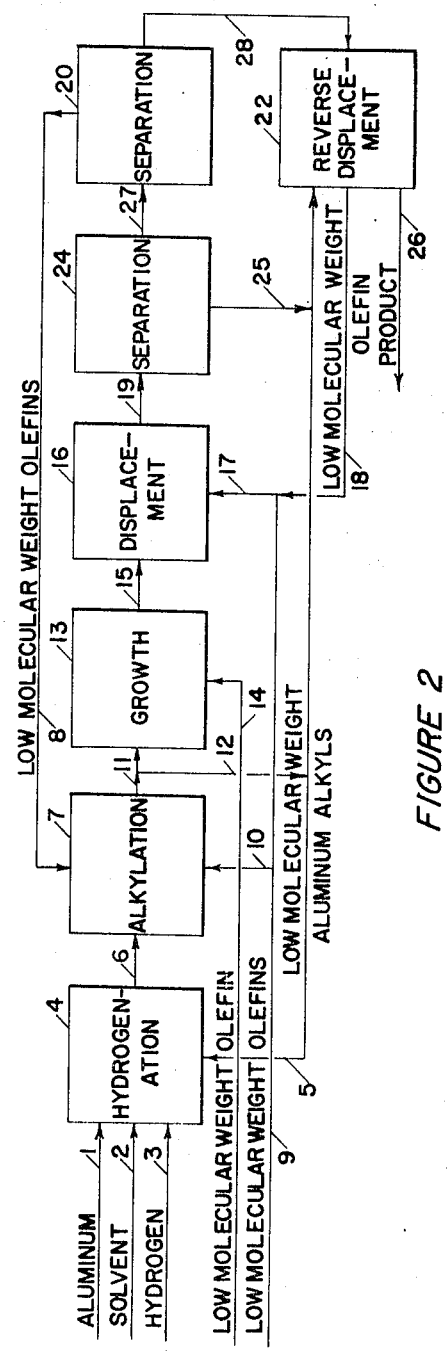

INVENTOR.
JERRY A. ACCIARRI
BY
William A. Mikesell
ATTORNEY

United States Patent Office 3,445,494
Patented May 20, 1969

3,445,494
PREPARATION OF ALUMINUM ALKYLS
Jerry A. Acciarri, Ponca City, Okla., assignor to Continental Oil Company, Ponca City, Okla., a corporation of Delaware
Continuation-in-part of application Ser. No. 353,375, Mar. 20, 1964. This application June 26, 1968, Ser. No. 744,250
Int. Cl. C07f 5/06
U.S. Cl. 260—448         9 Claims

ABSTRACT OF THE DISCLOSURE

Aluminum alkyls of higher average molecular weight than that which would be predicted by Poisson distribution can be obtained by alkylating aluminum alkyl hydrides first with an olefin stream comprising a mixture of olefins up to 10 carbon atoms, subjecting the alkylate to growth and displacement, separating the low molecular weight olefins from the aluminum alkyls and high molecular weight olefins, utilizing the thus separated low molecular weight olefins for said alkylation step and recovering high molecular weight aluminum alkyls by reverse displacement and separation.

---

This is a continuation-in-part of my earlier-filed application Ser. No. 353,375, filed Mar. 20, 1964, and now abandoned.

This invention relates to preparation of aluminum alkyls. In one aspect, the invention relates to a process for preparing aluminum alkyls of which the alkyl groups have a narrow range of carbon content by a growth reaction. In another aspect, the invention relates to a process for preparing, via a growth reaction, aluminum alkyls in which the alkyl groups are all of relatively high molecular weight to the essential exclusion of low molecular weight alkyls. In still another aspect, the invention relates to a process for preparing high molecular weight aluminum alkyls wherein a dialkylaluminum hydride is alkylated with a low molecular weight olefin, the resulting alkylate is subjected to a growth reaction to produce aluminum alkyls wherein the alkyl groups exhibit essentially a Poisson size distribution, the growth product product is subjected to displacement with a low molecular weight olefin whereby there are produced olefins corresponding essentially to the Poisson distribution and a low molecular weight trialkylaluminum, and the resulting olefins and trialkylaluminum are subjected to a series of process steps including separation of low molecular weight olefins and low molecular weight trialkylaluminum and one of alkylation and reverse displacement, whereby there is formed a product comprising trialkylaluminum in which the alkyl groups are of relatively high molecular weight.

The synthesis of trialkylaluminum compounds of varying molecular weights has recently received considerable attention, since these compounds are useful intermediates in the preparation of other organic compounds. For example, they can be oxidized to the corresponding alkoxide which is then readily hydrolyzed to the alcohol. They can be subjected to displacement with an olefin of low molecular weight to produce 1-olefins. One method of synthesizing trialkylaluminum is the so-called "growth" process wherein a low molecular weight trialkylaluminum, such as triethylaluminum or tripropylaluminum, is reacted with an olefin of 2 to about 4 carbon atoms under conditions which effect growth of the alkyl chains to a higher molecular weight trialkylaluminum according to the equation (1)

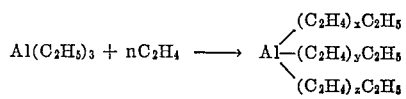

wherein $x$, $y$ and $z$ represent integers ranging from 0 to 14 (average 3–7) and $x+y+z=n$. This growth reaction is described in detail in, for example, U.S. Patent 2,971,969 to Paul A. Lobo, issued Feb. 14, 1961. However, when trialkylaluminum is prepared by this method, it is necessary to accept the entire spectrum of alkyl chain lengths, which are produced statistically according to the Poisson distribution equation $$P_n = \frac{m^n e^{-m}}{n!}$$

wherein $P_n$ represents the probability that a certain hydrocarbon radical will be formed by $n$ additions of ethylene to the aluminum-ethyl bond originally present and $m$ is the mean number of additions of ethylene per growing chain. From the point of process economics, this has meant that it has been necessary to accept undesirable products, that is, products of lesser value in order to effect the synthesis of desired products.

Accordingly, it is an object of this invention to provide an improved process for the preparation of aluminum alkyls. It is another object of this invention to provide a process for the production of aluminum alkyls wherein the chain length of said alkyls is selectively controlled. It is still another object of this invention to provide a process for the production of aluminum alkyl growth product having a nonstatistical distribution of alkyl groups. It is yet another object of this invention to provide a process for separating aluminum alkyls of varying molecular weights from aluminum alkyl growth product.

Other aspects, objects, and the several advantages of the invention will become apparent upon study of this disclosure, the appended claims, and the drawing, in which:

FIGURE 1 is a schematic flow diagram of one embodiment of my invention,

FIGURE 2 is a schematic flow diagram of a second embodiment of my invention.

Figure 3:
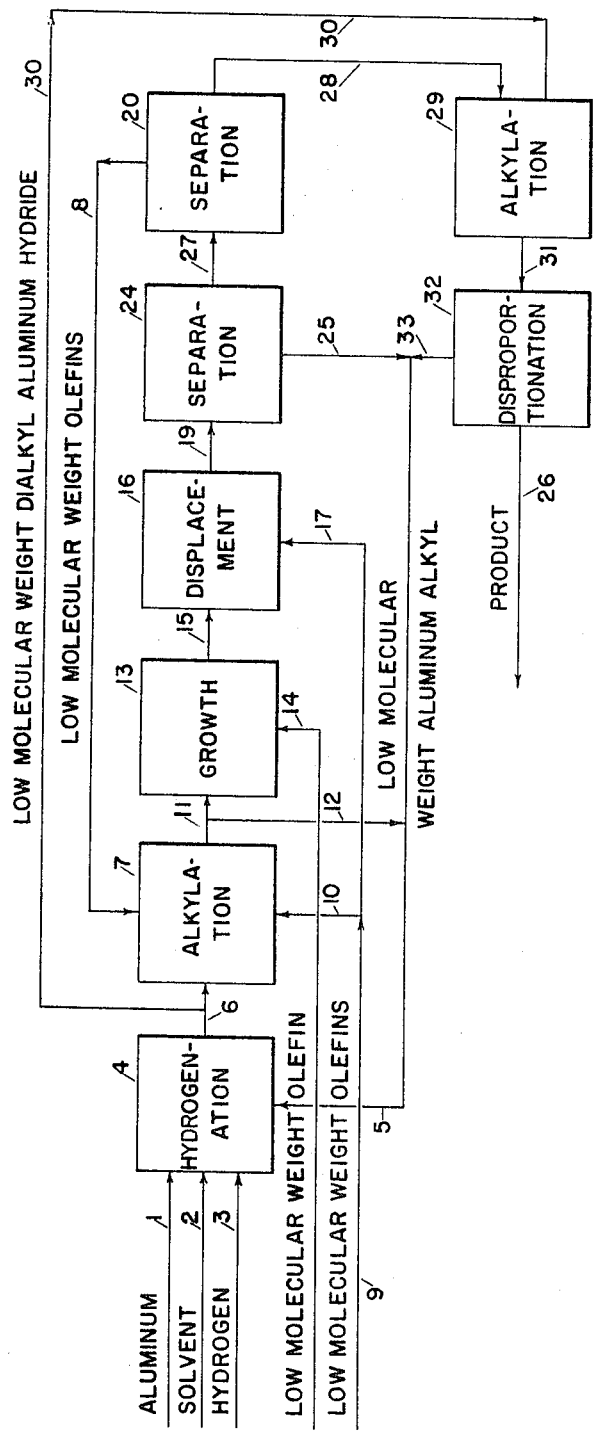
FIGURE 3 is a schematic flow diagram of a third embodiment of my invention.

Before proceeding with a description of my invention, it will be convenient to define certain recurring terms. As used herein, "low molecular weight olefins" means α-olefins of 10 carbons or less; "low molecular weight alkene" means an α-olefin of 2–4 carbon atoms, for which ethylene will be used as exemplary; "low molecular weight aluminum alkyls" means aluminum trialkyls in which two of the three alkyl groups each contain 5 carbon atoms or less; and "low molecular weight dialkylaluminum hydride" means that each of the two alkyl groups contains 5 carbon atoms or less. "High molecular weight dialkylaluminum hydride" means that each of the two alkyl groups contains 11 or more carbon atoms, "high molecular weight aluminum alkyls" means aluminum trialkyls in which two of the three alkyl groups each contain 11 carbon atoms or more, and "high molecular weight olefins" means α-olefins of 11 carbon atoms or more.

According to my invention, there is provided an integrated process for producing high molecular weight aluminum alkyls which comprises alkylating low molecular weight dialkyl aluminum hydride with low molecular weight olefins to produce low molecular weight aluminum alkyls, reacting the low molecular weight aluminum alkyls with low molecular weight alkene by the growth reaction to produce aluminum alkyls in which the alkyl groups exhibit essentially a Poisson distribution, reacting the thus-produced aluminum alkyls with a low molecular weight alkene to effect a displacement reaction and thereby produce a mixture of α-olefins exhibiting essentially a Poisson distribution and low molecular weight aluminum alkyls, and subjecting this mixture to separation for removal of low molecular weight olefins and low molecular weight aluminum alkyls and to one of alkylation and reverse displacement whereby there are produced high molecular weight aluminum alkyls. According to a first embodiment of this invention, the step of subjecting comprises separating from the displacement reaction product low molecular weight olefins which can be recycled to the alkylation, reacting the remaining high molecular weight olefins and low molecular weight aluminum alkyls under reverse displacement conditions to produce high molecular weight aluminum alkyls and low molecular weight alkene, which latter stream can be recycled to the alkylation and the displacement reactions, and separating from the remaining high molecular weight aluminum alkyl product any low molecular weight aluminum alkyls. According to a second embodiment of this invention, the step of subjecting comprises separating from the displacement reaction product low molecular weight aluminum alkyls which can be passed to a subsequent reverse displacement reaction, separating from the remaining olefins which exhibit essentially a Poisson distribution the low molecular weight olefins, which can be recycled to the alkylation, conducting with the remaining high molecular weight olefins a reverse displacement reaction with the low molecular weight aluminum alkyls previously mentioned, and recovering from the reverse displacement reaction high molecular weight aluminum alkyls as product and low molecular weight alkene which can be recycled to the displacement reaction. According to a third embodiment of this invention, the step of subjecting comprises separation of low molecular weight aluminum alkyls and low molecular weight olefins from the displacement reaction product as in the second embodiment, followed by alkylation with the remaining high molecular weight olefins of additional low molecular weight dialkylaluminum hydride and disproportionation to produce high molecular weight aluminum alkyls as product and low molecular weight aluminum alkyls which are separated from the product. According to a fourth embodiment of this invention, the step of subjecting comprises separation of low molecular weight aluminum alkyls and low molecular weight olefins from the displacement reaction product as in the third embodiment, followed by alkylation with the remaining high molecular weight olefins of high molecular weight dialkylaluminum hydride produced by hydrogenation of high molecular weight aluminum alkyls to produce high molecular weight aluminum alkyls as product, a portion of which can be recycled to the hydrogenation.

The invention disclosed and claimed in the application of Mark T. Atwood, Ser. No. 456,296 (filed May 17, 1965) is disclaimed in this application.

Referring now to the drawing for a more complete understanding of the invention, and especially to FIGURE 1 in connection with the first embodiment, a metallic aluminum feed 1, a solvent stream 2, and a hydrogen stream 3 are all passed to a hydrogenation reaction zone 4 along with a recycle stream of low molecular weight aluminum alkyls 5. Low molecular weight dialkylaluminum hydride is formed in zone 4 according to the equation (2) $$Al + 3/2 H_2 + 2AlR_3 \rightarrow 3HAlR_2$$

where R is n-alkyl of 2–10 carbons. The resulting dialkylaluminum hydride is passed by way of conduit 6 to alkylation reaction zone 7 along with a recycle stream of low molecular weight olefins by way of conduit 8 and a make-up stream of low molecular weight alkene by way of conduits 9 and 10. Low molecular weight aluminum alkyls are formed in zone 7 according to the equation (3) $$HAlR_2 + C_{R'}H_{2R'} \rightarrow R'AlR_2$$

where R' is n-alkyl of 2–10 carbons and subscript R' is a whole number equal to the number of carbons in radical R'. The low molecular weight aluminum alkyls produced in zone 7 are removed by way of conduit 11; a portion is recycled by way of conduits 12 and 5, and the remainder is passed to growth reaction zone 13 along with a feed stream of low molecular weight alkene, e.g., ethylene, introduced via conduit 14. The aluminum trialkyl in stream 11, previously indicated as R'AlR_2, can be written as AlR_3 since R is equal to R' as there defined, and the growth reaction can be illustrated by the equation (4) 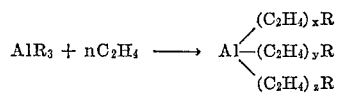

where $x$, $y$ and $z$ represent integers ranging from 0–14 (average 3–7), $x+y+z=n$, and R is, as previously defined, n-alkyl of 2–10 carbons. The resulting alkylaluminum will contain alkyl radicals of a size conforming essentially to the Poisson distribution, as previously discussed, and for an $m$ value of 4, the alkyl size distribution is about as follows (in weight percent of total): $C_2$, 0.5; $C_4$, 2.6; $C_6$, 9.8; $C_8$, 16.7; $C_{10}$, 19.9; $C_{12}$, 19.1; $C_{14}$, 14.6; $C_{16}$, 9.4; $C_{18}$, 5.2; and above $C_{18}$, 2.2. This alkylaluminum is passed by way of conduit 15 to displacement reaction zone 16 along with low molecular weight alkene introduced by way of conduits 9, 17 and 18. In zone 16, there are produced by the displacement reaction olefins of a size conforming essentially to the Poisson distribution, and low molecular weight aluminum alkyls, according to the equation (5) $$Al(R_p)_3 + 3C_R H_{2R} \rightarrow AlR_3 + 3C_{R_p}H_{2R_p}$$

wherein radical R and subscript R are as previously defined, radical $R_p$ is n-alkyl of size representing the Poisson distribution, and subscript $R_p$ is an integer equal to the number of carbons in radical $R_p$. The mixture of Poisson olefins and low molecular weight aluminum alkyls is passed by way of conduit 19 to separation zone 20, in which low molecular weight olefins are removed by such as distillation and recycled by way of conduit 8 as previously described. The remaining mixture, comprising high molecular weight olefins and low molecular weight aluminum alkyls, is passed by way of conduit 21 to reverse displacement reaction zone 22, in which a reaction essentially the reverse of that of zone 16 is carried out according to the equation (6) $$3C_{R''}H_{2R''} + AlR_3 \rightarrow AlR''_3 + 3C_R H_{2R}$$

wherein radical R and subscript R are as previously defined, radical R'' is n-alkyl of 11 or more carbons, and subscript R'' is an integer equal to the number of carbons in radical R''. The low molecular weight alkene formed in zone 22 is separated and recycled by way of conduit 18 as previously described. The remainder of the reaction effluent, comprising high molecular weight aluminum alkyls, is passed by way of conduit 23 to separation zone 24 in which any traces of remaining low molecular weight aluminum alkyls are removed by way of conduit 25 for recycle by way of conduit 5, and the high molecular weight aluminum alkyls are removed as product by way of conduit 26. Thus, it is seen that there has been provided an integrated process wherein preferably the only net product stream comprises high molecular weight aluminum alkyls, although it will be recognized that if other products, for example high molecular weight olefins are desired, they can be removed at an appropriate place in the system. The high molecular weight aluminum alkyls product can, if desired, be oxidized and hydrolyzed to produce the corresponding alcohols or can be further fractionated or otherwise utilized.

Referring now to the second embodiment of this invention, as set forth in FIGURE 2, like numerals are used to represent portions corresponding to FIGURE 1. All numerals 1–17 and 19 correspond exactly to FIGURE 1, since this embodiment is identical to that of FIGURE 1 up through displacement zone 16 and its effluent. In this embodiment, displacement effluent in conduit 19, comprising low molecular weight aluminum alkyls and olefins of essentially a Poisson distribution are first separated in zone 24 to remove low molecular weight aluminum alkyls which are passed by way of conduit 25 to zone 22 and conduit 5 to zone 4, and the Poisson olefins are then passed via conduit 27 to zone separation zone 20. In zone 20, low molecular weight olefins are removed for recycle by way of conduit 8, and the remaining high molecular weight olefins are passed by way of conduit 28 to reverse displacement zone 22. Here the same reverse displacement and separation are effected as in zone 22 of FIGURE 1, viz., high molecular weight olefins from conduit 28 displace the alkyl groups of low molecular weight aluminum alkyls from conduit 25, producing low molecular weight alkene which is recycled via conduit 18, and high molecular weight aluminum alkyl product, removed via conduit 26. Summarizing the differences of these embodiments, the sequence of zones in FIGURE 1 is 20–22–24 while that of FIGURE 2 is 24–20–22, although the same net result is produced.

Referring now to the third embodiment of this invention, as set forth in FIGURE 3, like numerals are used to represent portions corresponding to FIGURE 2. All numerals 1–17, 19, 20 and 24–28 correspond exactly to FIGURE 2, since this embodiment is identical to that of FIGURE 2 up through low molecular weight olefin recovery zone 20 and its effluent 28. In this embodiment, the high molecular weight olefins in conduit 28 are passed to alkylation zone 29, wherein they are reacted with a portion of the low molecular weight dialkylaluminum hydride produced in hydrogenation reaction zone 4 and introduced by way of conduits 6 and 30 according to the equation (7) 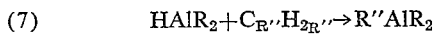     $HAlR_2 + C_{R''}H_{2R''} \rightarrow R''AlR_2$ wherein radical and subscript R and radical and subscript R'' are as previously defined. The resulting alkylaluminum of which one alkyl group is high molecular weight and the remaining two are low molecular weight is passed by way of conduit 31 to disproportionation and seperation zone 32. Disproportionation is effected in zone 32 according to the equation (8)     $3R_2AlR'' \rightarrow AlR''_3 + 2AlR_3$ wherein radicals R and R'' are previously defined, and the resulting low molecular weight aluminum alkyl is recycled by way of conduit 33 while the product high molecular weight aluminum alkyl is removed by way of conduit 26. It is accordingly seen that alkylation of low molecular weight dialkylaluminum hydride and disproportionation of the resulting product in this embodiment take the place of the reverse displacement of the second embodiment.

Figure 4:
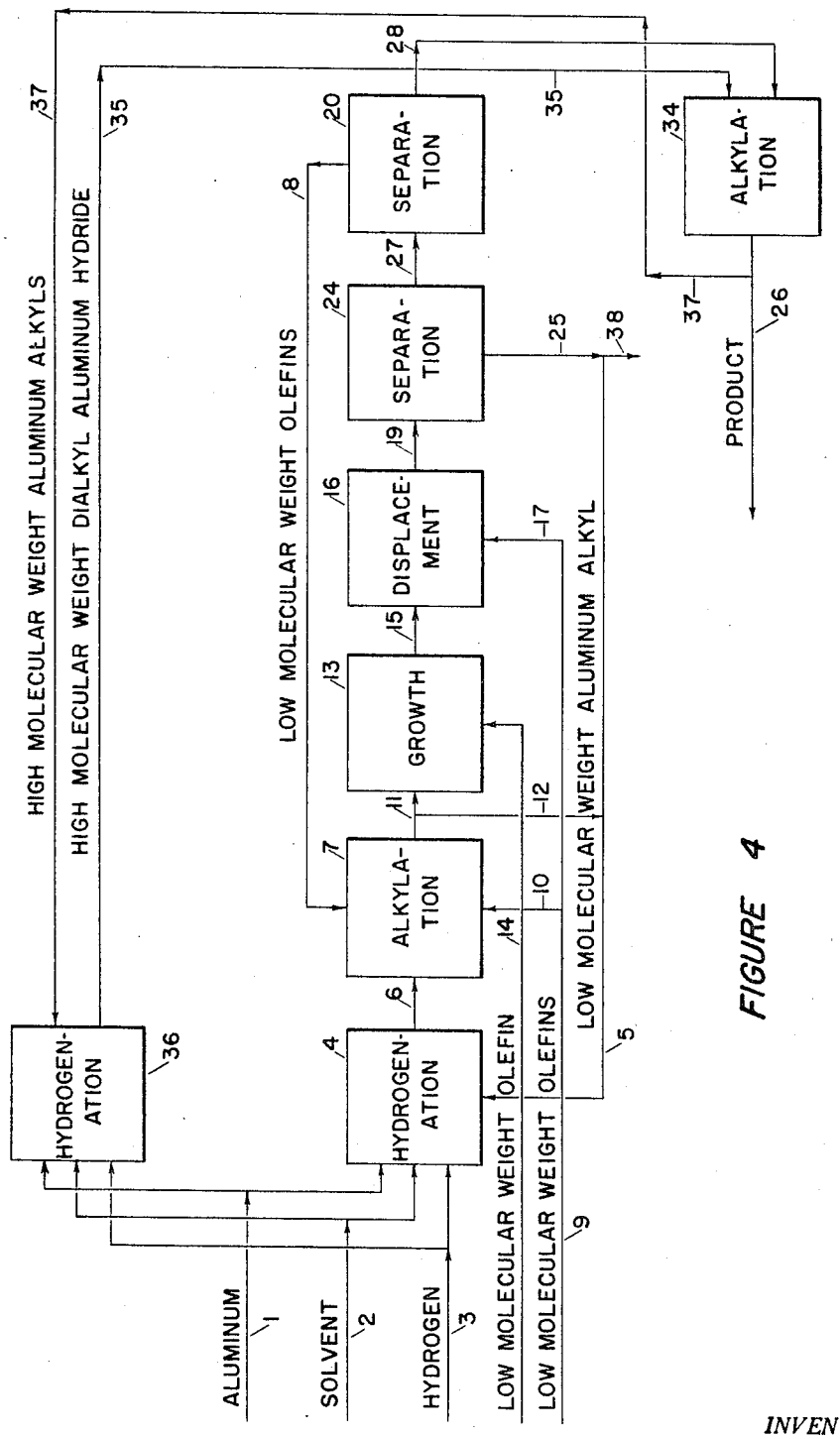
FIGURE 4 is a schematic flow diagram of a fourth embodiment of my invention.

Referring now to the fourth embodiment of this invention, as set forth in FIGURE 4, like numerals are used to represent portions corresponding to FIGURE 3. All numerals 1–17, 19, 20, and 24–28 correspond exactly to FIGURE 3, since this embodiment is identical to that of FIGURE 3 up through low molecular weight olefin recovery zone 20 and its effluent 28. In this embodiment, the high molecular weight olefins in conduit 28 are passed to alkylation zone 34, wherein they are reacted with high molecular weight dialkylaluminum hydride introduced by way of conduit 35 according to the equation (9)      $HAl(R'')_2 + C_{R''}H_{2R''} \rightarrow Al(R'')_3$ wherein radical and subscript R'' are as previously defined. The resulting high molecular weight aluminum alkyls are removed as product by way of conduit 26, and a portion of these is preferably recycled by way of conduit 37 to hydrogenation reaction zone 36 in order to produce the high molecular weight dialkylaluminum hydride which was passed to alkylation zone 34 via conduit 35. Another portion of feed reactants aluminum and hydrogen, and solvent, are also introduced to zone 36 where the hydrogenation proceeds according to the equation

(10) 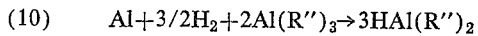     $Al + 3/2 H_2 + 2Al(R'')_3 \rightarrow 3HAl(R'')_2$ wherein radical R'' is as previously defined. Excess low molecular weight aluminum alkyl can be removed as product by way of conduit 38. It is seen here that use of high molecular weight dialkylaluminum hydride for the alkylation in zone 34 eliminates the need for the disproportionation in zone 32 of FIGURE 3, but requires the hydrogenation of zone 36.

The preceding four embodiments have many advantages and modifications common to all, and others unique to a given embodiment. Among the common advantages are:

(1) A substantial reduction and even complete elimination of low molecular weight aluminum alkyl as product.

(2) Complete recovery as high molecular weight aluminum alkyls of α-olefins formed by the growth reaction.

(3) Reduction in the amount of aluminum raw material required for producing a given amount of product.

(4) Reduction in the amount of product containing alkyl groups of 20 or more carbon atoms.

(5) Minimizing explosion hazard in the growth reactor.

(6) Provides for the recovery and sale of pure α-olefins and various aluminum trialkyls.

(7) Allows production of odorless alcohol sulfates not possible with many present alcohol processes.

Modifications which are possible with the embodiment of FIGURE 1 include:

(1) The amount and types of high molecular weight aluminum alkyls can be controlled by the olefin split made at item 20 of FIGURE 1. Even a controlled amount of light (6 to 10 carbon atoms per alkyl) aluminum alkyls can be made if desired.

(2) The low molecular weight alkene make-up to the alkylation reactor 7 can comprise ethylene, propylene, butene, pentene, cracked wax olefins of 4 to 9 carbon atoms, or mixtures of these.

(3) The low molecular weight α-olefins used in the displacement reactor 16 can be ethylene, propylene, butenes, pentenes, or mixtures of these.

(4) The displacement reaction can be either thermal or catalytic. If catalytic displacement is used, however, the catalyst must be poisoned before the low molecular weight olefins are separated in recovery zone 20 or isomerization of the α-olefins will occur.

(5) The composition of the low molecular weight aluminum alkyls recycle stream 25 will depend upon the olefin used in displacement zone 16, and can be triethylaluminum, tripropylaluminum, tributylaluminum or mixtures of these.

(6) Reverse displacement in reaction zone 22 can be either catalytic or thermal. Catalytic reverse displacement will produce straight-chain aluminum alkyl, while thermal reverse displacement will produce some branched-chain aluminum alkyls, mainly the 2-alkyl isomers.

Modifications of the embodiment according to FIGURE 2 include:

(1) See modifications 1–6 to FIGURE 1, supra.

(2) Pure aluminum triethyl or other low molecular weight trialkylaluminum is available at recovery zone 24.

(3) Any pure α-olefin is available by proper fractionation at stream 28 or stream 8.

Modifications of the embodiment of FIGURE 3 include:

(1) See modifications 1–5 to FIGURE 1, supra.

(2) See modifications 2 and 3 to FIGURE 2, supra.

(3) The compostion of the low molecular weight dialkylaluminum hydride to the alkylation reactor 29 depends upon the olefin used in displacement zone 16.

Modifications of the embodiment of FIGURE 4 include modifications 1 and 2 of FIGURE 3, supra.

Following is a tabulation of the broad and preferred conditions prevailing in each of the reaction zones:

| Zone | Temperature, °F. | | Pressure | |
|---|---|---|---|---|
| | Broad | Preferred | Broad | Preferred |
| Hydrogenation, 4 and 36 | 175–305 | 210–300 | 50–400 atm | 60–300 atm. |
| Alkylation, 7, 29 and 34 | 150–275 | (1) | Sufficient to maintain liquid. | Sufficient to maintain liquid. |
| Growth, 13 | 150–310 | 195–250 | 200–5,000 p.s.i.a. | 1,000–3,500 p.s.i.a. |
| Displacement, 16: | | | | |
| Thermal | 120–485 | 210–250 | To maintain liquid. | 10–100 atm. |
| Catalytic | 120–310 | 175–260 | ___do___ | To maintain liquid. |
| Reverse displacement, 22 | 50–300 | 150–250 | ___do___ | Above atmospheric. |
| Disproportionation, 32 | 150–300 | 175–250 | Below atmospheric | 1–500 mm. Hg. |

1 Below about 250.

The instant process is preferably carried out in the presence of a solvent or diluent, which is inert to the reactants and products under the conditions employed. This material, introduced by way of conduit 2, can be for example paraffinic, cycloparaffinic or aromatic such as kerosene, isooctane, xylene, cyclohexane, benzene, and the like. The diluent aids in controlling the temperature of the various reactions and also acts as a solvent for the growth product.

The hydrogenation reaction of zones 4 and 36, given above by Equations 2 and 10, is carried out in an excess of hydrogen. Although the reaction will occur over a wide range of ratios of aluminum to low molecular weight trialkylaluminum, the ratio is preferably between 0.1:1 to 10:1 and more preferably between 1:1 and 4:1.

The displacement reaction of zone 16, illustrated above by Equation 5, can be either thermal or catalytic. Catalytic displacement is described in, for example, U.S. Patent 2,978,523 to Coyne et al., and involves broadly the use of a reduction catalyst such as nickel, cobalt, palladium, or certain iron compounds in an amount between about 0.001 and 0.1 weight percent based on growth product. Thermal displacement can be carried out as disclosed in U.S. Patent 2,781,410 to Ziegler et al. Alternatively, thermal displacement can be effected by atomizing the growth product in the presence of the displacing olefin. Conditions for this technique are: residence time, 30 seconds to 15 minutes and preferably about 3 to about 7 minutes; temperature, 105° F. to 700° F., preferably about 395° F. to about 555° F.; and pressure between about 1 and 200 p.s.i.a., preferably between about 20 and about 100 p.s.i.a.

The reverse displacement reaction of zone 22, illustrated by Equation 6, is preferably effected by a reaction time of at least 15 minutes, and more preferably of at least ½ hour.

The disproportionation in zone 32, illustrated by equation 8, is conducted under low pressure in order to remove the low molecular weight trialkylaluminum from the reaction by distillation as it is formed; distillation conditions of pressure and temperature will govern the molecular weight range of the overhead material, taking into account also the heat sensitivity of aluminum trialkyl materials.

The separations which occur in zones 20, 22 and 24 involve removal of low molecular weight olefins in the first two instances, and low molecular weight aluminum alkyls in the last instance; these separations are again preferably effected by distillation, with the conditions of pressure and temperature governing the "split" in known manner; however, it is well known in the art that certain olefins boil at essentially the same temperature as do certain low molecular weight aluminum alkyls, and thus cannot be separated by distillation. Thus the separation of full range olefins from aluminum triethyl must be done by other known means such as complexing with certain complexing agents of which alkali metal cyanides, alkali metal fluorides, ethers, thioethers, and alkyl ammonium halides are representative, for example, see U.S. Patents 3,328,446 and 3,308,143, both based on applications filed Nov. 14, 1962. Although the presently-preferred split between low and high molecular weight alkyls has been exemplified as being between the alkyls of 10 or less carbons and the alkyls of 11 or more carbons, it is obvious that the separations of zones 20, 22 and 24 can be operated in conjunction with growth reactor 13 so as to yield a product by way of conduit 26 which will contain olefins of a minimum carbon content of greater or less than 10 or 12, and a maximum carbon content of greater or less than about 30.

In the presently-preferred operation of this invention, the low molecular weight alkene feed of this invention is ethylene, and the low molecular weight aluminum alkyl subjected to the growth reaction is triethylaluminum. The product when operating in this manner comprises high molecular weight aluminum alkyls in which the alkyl groups contain an even number of carbon atoms which can, as mentioned previously, be oxidized and hydrolyzed to the corresponding alcohols.

The following examples are presented in illustration of the various embodiments of this invention.

EXAMPLE 1

[All streams in lb.-mols]

| Stream Number | Aluminum | Hydrogen | Ethylene | ($C_2$–$C_{10}$) Dialkyl Aluminum Hydride | ($C_2$–$C_{10}$) Aluminum Alkyls | ($C_{12}$+) Aluminum Alkyls | ($C_2$–$C_{30}$) Aluminum Alkyls | Aluminum Triethyl | Low M.W. Olefins | High M.W. Olefins |
|---|---|---|---|---|---|---|---|---|---|---|
| 1 | 1.0 | | | | | | | | | |
| 3 | | 1.5 | | | | | | | | |
| 5 | | | | | 1.0 | | | 1.0 | | |
| 6 | | | | 3.0 | | | | | | |
| 8 | | | | | | | | | 3.0 | |
| 9 | | | 3.0 | | | | | | | |
| 10 | | | 10.0 | | | | | | | |
| 11 | | | | | 3.0 | | | | | |
| 11 minus 12 | | | | | 2.0 | | | | | |
| 12 | | | | | 1.0 | | | | | |
| 14 | | | (2) | | | | | | | |
| 15 | | | | | | | 2.0 | | | |
| 17 | | | 6.0 | | | | | | | |
| 18 | | | 3.0 | | | | | | | |
| 19 | | | | | | | | | 2.0 | 3.0 | 3.0 |
| 21 | | | | | | | | | 2.0 | | 3.0 |
| 23 | | | | | | 1.0 | | | 1.0 | | |
| 25 | | | | | | | | | 1.0 | | |
| 26 | | | | | | | | | | 1.0 | |

1 Makeup required only to balance stream and yield losses.
2 Variable amounts of ethylene can be used for growth reaction.

EXAMPLE 2

[All streams in lb.-mols]

| Stream Number | Aluminum | Hydrogen | Ethylene | (C$_2$-C$_{10}$) Dialkyl Aluminum Hydride | (C$_2$-C$_{10}$) Aluminum Alkyls | (C$_{12}$+) Aluminum Alkyls | (C$_2$-C$_{30}$) Aluminum Alkyls | Aluminum Triethyl | Low M.W. Olefins | High M.W. Olefins |
|---|---|---|---|---|---|---|---|---|---|---|
| 1 | 1.0 | | | | | | | | | |
| 3 | | 1.5 | | | | | | | | |
| 5 | | | | | 1.0 | | | 1.0 | | |
| 5 minus 12 | | | | | | | | 1.0 | | |
| 6 | | | | 3.0 | | | | | | |
| 8 | | | | | | | | | 3.0 | |
| 9 | | | | 3.0 | | | | | | |
| 10 | | | | [1] 0.0 | | | | | | |
| 11 | | | | | 3.0 | | | | | |
| 11 minus 12 | | | | | 2.0 | | | | | |
| 12 | | | | | 1.0 | | | | | |
| 14 | | | [2] | | | | | | | |
| 15 | | | | | | | | 2.0 | | |
| 17 | | | | 6.0 | | | | | | |
| 18 | | | | 3.0 | | | | | | |
| 19 | | | | | | | | 2.0 | 3.0 | 3.0 |
| 25 | | | | | | | | 2.0 | | |
| 25 plus 12 minus 5 | | | | | | | | 1.0 | | |
| 26 | | | | | | 1.0 | | | | |
| 27 | | | | | | | | | 3.0 | 3.0 |
| 28 | | | | | | | | | | 3.0 |

[1] Makeup required only to balance stream and yield losses.
[2] Variable amounts of ethylene can be used for growth reaction.

EXAMPLE 3

[All streams in lb.-mols]

| Stream Number | Aluminum | Hydrogen | Ethylene | (C$_2$-C$_{10}$) Dialkyl Aluminum Hydride | (C$_2$-C$_{10}$) Aluminum Alkyls | (C$_{12}$+) Aluminum Alkyls | (C$_2$-C$_{30}$) Aluminum Alkyls | Aluminum Triethyl | Low M.W. Olefins | High M.W. Olefins |
|---|---|---|---|---|---|---|---|---|---|---|
| 1 | 1.0 | | | | | | | | | |
| 3 | | 1.5 | | | | | | | | |
| 5 | | | | | 3.0 | | | 2.0 | | |
| 6 | | | | 6.0 | | | | | | |
| 6 minus 30 | | | | 3.0 | | | | | | |
| 8 | | | | | | | | | 3.0 | |
| 9 | | | | [1] 0.0 | | | | | | |
| 11 | | | | | 3.0 | | | | | |
| 11 minus 12 | | | | | 2.0 | | | | | |
| 12 | | | | | 1.0 | | | | | |
| 14 | | | [2] | | | | | | | |
| 15 | | | | | | | | 2.0 | | |
| 17 | | | | 6.0 | | | | | | |
| 19 | | | | | | | | 2.0 | 3.0 | 3.0 |
| 25 | | | | | | | | 2.0 | | |
| 25 plus 33 | | | | | 2.0 | | | 2.0 | | |
| 26 | | | | | | 1.0 | | | | |
| 27 | | | | | | | | | 3.0 | 3.0 |
| 28 | | | | | | | | | | 3.0 |
| 30 | | | | 3.0 | | | | | | |
| 31 | | | | | 2.0 | 1.0 | | | | |
| 33 | | | | | 2.0 | | | | | |

[1] Makeup required only to balance stream and yield losses.
[2] Variable amounts of ethylene can be used for growth reaction.

EXAMPLE 4

[All streams in lb.-mols]

| Stream Number | Aluminum | Hydrogen | Ethylene | (C$_2$-C$_{10}$) Dialkyl Aluminum Hydride | (C$_{12}$+) Dialkyl Aluminum Hydride | (C$_2$-C$_{10}$) Aluminum Alkyls | (C$_{12}$+) Aluminum Alkyls | (C$_2$-C$_{30}$) Aluminum Alkyls | Aluminum Triethyl | Low M.W. Olefins | High M.W. Olefins |
|---|---|---|---|---|---|---|---|---|---|---|---|
| 1 | 2.0 | | | | | | | | | | |
| 3 | | 3.0 | | | | | | | | | |
| to 4 | 1.0 | 1.5 | | | | | | | | | |
| 5 | | | | | | 1.0 | | | 1.0 | | |
| 6 | | | | 3.0 | | | | | | | |
| 8 | | | | | | | | | | 3.0 | |
| 9 | | | | 6.0 | | | | | | | |
| 10 | | | | [1] 0.0 | | | | | | | |
| 11 | | | | | | 3.0 | | | | | |
| 11 minus 12 | | | | | | 2.0 | | | | | |
| 12 | | | | | | 1.0 | | | | | |
| 14 | | | [2] | | | | | | | | |
| 15 | | | | | | | | | 2.0 | | |
| 17 | | | | 6.0 | | | | | | | |
| 19 | | | | | | | | | 2.0 | 3.0 | 3.0 |
| 25 | | | | | | | | | 2.0 | | |
| 26 | | | | | | | 1.0 | | | | |
| 26 minus 37 | | | | | | | 3.0 | | | | |
| 27 | | | | | | | | | | 3.0 | 3.0 |
| 28 | | | | | | | | | | | 3.0 |
| 35 | | | | | 3.0 | | | | | | |
| to 36 | 1.0 | 1.5 | | | | | | | | | |
| 37 | | | | | | | | | 2.0 | | |
| 38 | | | | | | | 1.0 | | | | |

[1] Makeup required only to balance stream and yield losses.
[2] Variable amounts of ethylene can be used for growth reaction.

In all of the preceding examples, the feedstocks and separations are such that the product stream 26 has the following approximate composition in weight percent, based on hydrolysis to alcohols: $C_4$, 0.35; $C_{63}$, 0.70; $C_8$, 0.80; $C_{10}$, 1.10; $C_{12}$, 38.0; $C_{14}$, 30.0; $C_{16}$, 19.0 and $C_{18}$, 10.0. It can be seen that the desired high molecular weight products are predominant. In these examples, it is noted that well over 90% of the product alkyl groups are $C_{10}$ or greater, although it will be obvious to one skilled in the art that the process of this invention is very flexible in that the size of the alkyl group in the product can be varied widely, depending upon the conditions used in the various reactions and the "depths" of the various separations.

Reasonable variation and modification are possible within the scope of this disclosure, the drawing, and the appended claims to the invention, the essence of which is that there is provided a process for varying the distribution of product molecular size in the growth process.

What is claimed is:

1. A process for producing aluminum trialkyl of high molecular weight which comprises:
   (a) reacting aluminum metal, hydrogen, and low molecular weight aluminum alkyls to produce low molecular weight dialkyl aluminum hydride,
   (b) reacting at least a portion of the thus-produced hydride with low molecular weight alkene to produce low molecular weight aluminum alkyls,
   (c) reacting the thus-produced alkyls with a low molecular weight alkene under conditions effective to cause growth whereby there is produced a trialkylaluminum in which the alkyl groups exhibit essentially a Poisson size distribution,
   (d) displacing the alkyl groups of the thus-formed trialkyl aluminum with low molecular weight alkene so as to produce a mixture of olefins exhibiting essentially a Poisson size distribution and low molecular weight trialkylaluminum,
   (e) separating the mixture of step (d) into a low molecular weight olefins fraction and a fraction comprising high molecular weight olefins and low molecular weight trialkylaluminum,
   (f) returning at least a portion of the first-mentioned fraction of step (e) to step (b),
   (g) subjecting the second-mentioned fraction of step (e) to conditions effective to produce high molecular weight aluminum alkyls and low molecular weight alkene by reverse displacement,
   (h) separating the product of step (g) into a low molecular weight alkene fraction and a high molecular weight aluminum alkyls fraction,
   (i) returning a portion of the first-mentioned fraction of step (h) to one of step (b) and step (d), and
   (j) separating from the second mentioned fraction of step (h) remaining low molecular weight aluminum alkyls, whereby the desired high molecular weight aluminum trialkyl is recovered.

2. A process for producing aluminum trialkyl of high molecular weight which comprises:
   (a) reacting aluminum metal, hydrogen, and low molecular weight aluminum alkyls to produce low molceular weight dialkyl aluminum hydride,
   (b) reacting at least a portion of the thus-produced hydride with low molecular weight alkene to produce low molecular weight aluminum alkyls,
   (c) reacting the thus-produced alkyls with a low molecular weight alkene under conditions effective to cause growth whereby there is produced a trialkylaluminum in which the alkyl groups exhibit essentially a Poisson size distribution,
   (d) displacing the alkyl groups of the thus-formed arialkylaluminum with low molecular weight alkene so as to produce a mixture of olefins exhibiting essentially a Poisson size distribution and low molecular weight trialkylaluminum,
   (e) separating the mixture of step (d) into a low molecular weight trialkylaluminum fraction and a fraction comprising olefins exhibiting essentially a Poisson size distribution,
   (f) passing at least a portion of the first-mentioned fraction of step (e) to step (i),
   (g) separating the second-mentioned fraction of step (e) into a fraction comprising low molecular weight olefins and a fraction comprising high molecular weight olefins,
   (h) passing at least a portion of the first-mentioned fraction of step (g) to step (b),
   (i) subjecting the second-mentioned fraction of step (g) to reverse displacement reaction with low molecular weight trialkylaluminum, whereby there are produced high molecular weight trialkylaluminum and low molecular weight alkene, and
   (j) separating the low molecular weight alkene from the product of step (i) and returning at least a portion of the thus-separated olefins to step (d), whereby the desired high molecular weight aluminum trialkyl is recovered.

3. A process for producing aluminum trialkyl of high molecular weight which comprises:
   (a) reacting aluminum metal, hydrogen, and low molecular weight aluminum alkyls to produce low molecular weight dialkyl aluminum hydride,
   (b) reacting at least a portion of the thus-produced hydride with low molecular weight alkene to produce low molecular weight aluminum alkyls,
   (c) reacting the thus-produced alkyls with a low molecular weight alkene under conditions effective to cause growth whereby there is produced a trialkylaluminum in which the alkyl groups exhibit essentially a Poisson size distribution,
   (d) displacing the alkyl groups of the thus-formed trialkylaluminum with low molecular weight alkene so as to produce a mixture of olefins exhibiting essentially a Poisson size distribution and low molecular weight trialkylaluminum,
   (e) separating the mixture of step (d) into a low molecular weight trialkylaluminum fraction and a fraction comprising olefins exhibiting essentially a Poisson size distribution,
   (f) passing at least a portion of the first-mentioned fraction of step (e) to step (a),
   (g) separating the second-mentioned fraction of step (e) into a fraction comprising low molecular weight olefins and a fraction comprising high molecular weight olefins,
   (h) passing at least a portion of the first-mentioned fraction of step (g) to step (b),
   (i) reacting aluminum, hydrogen, and high molecular weight aluminum trialkyls of step (j) to produce high molecular weight dialkylaluminum hydride,
   (j) subjecting the second-mentioned fraction of step (g) to alkylation reaction with the high molecular weight dialkylaluminum hydride of step (i), whereby there is produced high molecular weight trialkylaluminum and
   (k) returning a portion of the product of step (j) to step (i) whereby the desired high molecular weight aluminum trialkyl is recovered.

4. The process of claim 1, wherein the fractions of step (e) comprise olefins of up to about 10 carbon atoms, and olefins of greater than about 10 carbon atoms, respectively.

5. The process of claim 4 wherein the low molecular weight alkene of step (c) comprises ethylene.

6. The process of claim 2 wherein the fractions produced in step (g) comprise olefins of up to about 10 carbon atoms, and olefins of greater than about 10 carbon atoms, respectively.

7. The process of claim 6 wherein the low molecular weight alkene of step (c) comprises ethylene.

8. The process of claim 3 wherein the fractions produced in step (g) comprise olefins of up to about 10 carbon atoms, and olefins of greater than about 10 carbon atoms, respectively.

9. The process of claim 8 wherein the low molecular weight alkene of step (c) comprises ethylene.

References Cited

UNITED STATES PATENTS

| | | |
|---|---|---|
| 2,863,896 | 12/1958 | Johnson. |
| 3,180,881 | 4/1965 | Zosel et al. |
| 3,207,770 | 9/1965 | Ziegler et al. |
| 3,249,648 | 5/1966 | Carter et al. |
| 3,308,143 | 3/1967 | Poe et al. |
| 3,328,446 | 6/1967 | Poe et al. |
| 3,352,940 | 11/1967 | Linden et al. |
| 3,384,651 | 5/1968 | Davis. |

TOBIAS E. LEVOW, *Primary Examiner.*

H. M. S. SNEED, *Assistant Examiner.*

U.S. Cl. X.R.

260—677